No. 773,871. PATENTED NOV. 1, 1904.
A. HORNER.
BEDDING AND FURROWING DISK PLOW.
APPLICATION FILED JUNE 1, 1904.
NO MODEL.

Witnesses:—
F. C. Fliedner

Inventor,
Albert Horner
By Geo. H. Strong
Atty.

No. 773,871. Patented November 1, 1904.

UNITED STATES PATENT OFFICE.

ALBERT HORNER, OF PAANILO, TERRITORY OF HAWAII.

BEDDING AND FURROWING DISK PLOW.

SPECIFICATION forming part of Letters Patent No. 773,871, dated November 1, 1904.

Application filed June 1, 1904. Serial No. 210,658. (No model.)

*To all whom it may concern:*

Be it known that I, ALBERT HORNER, a citizen of the United States, residing at Paanilo, Territory of Hawaii, have invented new and useful Improvements in Bedding and Furrowing Disk Plows, of which the following is a specification.

My invention relates to improvements in apparatus for cultivating the ground, and it is especially adapted for work on sugar-plantations.

It consists in the combination and arrangement of a plurality of inclined revoluble disks, with means whereby the earth may be thrown either to or from the cane-rows at will, and revolving knives by which the cane or ratoon stools or stumps may be cut into small pieces.

It also comprises details of construction, which will be more fully explained by reference to the accompanying drawings.

Figure 1:
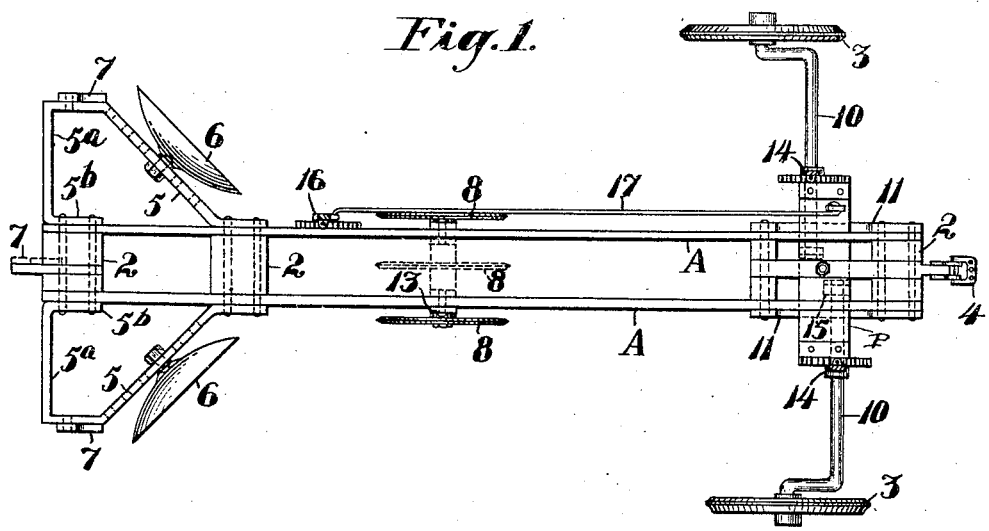
Figure 2:
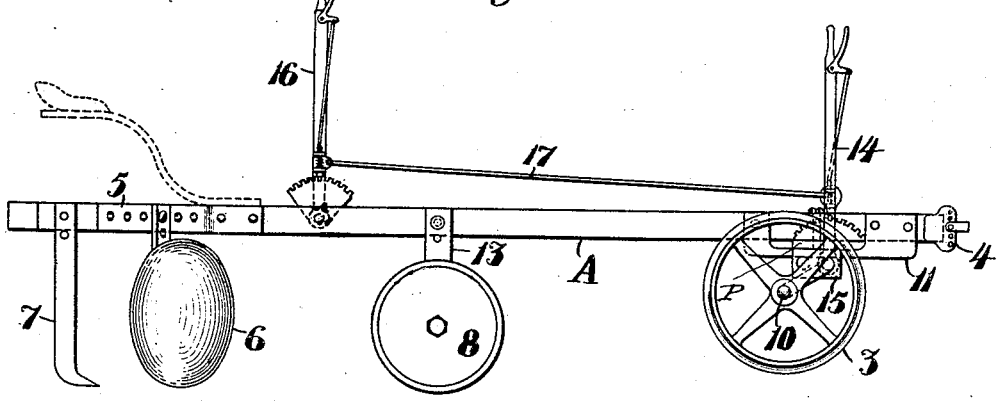

Figure 1 is a plan view of my apparatus, showing revolving knives and subsoiling-plow in dotted lines when substituted. Fig. 2 is a side view of same.

As illustrated in my present invention, I have shown two substantially parallel beams or frames A A, which are adapted to either lie close together or they may be separated and secured in parallel lines with intermediate space-blocks 2, as will be hereinafter more fully explained. This plow-beam frame is mounted upon bearing-wheels, as shown at 3, and at the front is provided with a pole or means for connecting with the draft-animals, as at 4. Upon each side of the plow-beams are secured substantially triangular frames 5, from which depend hangers or supports for the inclined revoluble disks 6. In the rear of each of the disks and substantially in line with its line of travel is a subsoiling-plow, as at 7, and in front of the disks I have shown the revolving sharp-edged cutters 8.

This apparatus may be employed for hilling and cultivating the ratoons, for furrowing and planting on irrigated or unirrigated plantations, for bursting out the centers and hilling, for straddling the cane-rows and throwing the soil from the cane to the middle of the rows or bedding, and for splitting the ratoon or cane stool stumps into pieces, thus avoiding the whole system of plowing up the stools and a crew of men with mattocks or plantation-hoes to cut them in pieces.

In the construction I have shown the front ends of the disk-supporting frames 5 as bolted through the space-blocks and the beams, the space-blocks being inside of the beams. The rear ends of the triangular frames extend across the back transverse to the line of the plow-beams, as shown at $5^a$, and they are bent forward at right angles, as shown at $5^b$, and bolts passing through this portion of the frames and through the rear space-block and the rear ends of the plow-beams secure this portion of the structure firmly and rigidly together.

The front end of the machine carries the revolving colter wheels or knives 8, and these are supported substantially in line in front of the disks, their position being determined by their attachment and support from the frame.

If it be desired to straddle the rows, the beams may be separated and the spacing-blocks fitted between them, in which case the triangular frames 5 will be secured to the outside of the beams and through them and the spacing-blocks now located between the beams.

The standards which carry the disks are perforated or otherwise constructed so that they may be raised or depressed with relation to the supporting-frames, and the diagonally-disposed inclined disks may be brought as nearly together as possible to regulate the width of the furrow by their adjustment upon the front portions of the triangular frames, and they may also be raised or depressed to vary the depth of the cut by the adjustment of their supporting-standards. The subsoiling-plows which follow the right and left hand disk plows may in like manner be raised or depressed in unison with or independently of the adjustment of the disks.

Suitable gage-wheels are connected with the front part of the plow and means for adjusting the same to regulate the depth of the cut. Thus for hilling and cultivating the ratoons the disks will be so disposed as to throw the earth up on either side of the rows, or they may be so arranged as to throw the earth away from the rows and into the depressed furrows between them.

The revolving colter wheels or knives serve to cut the ratoon or cane stool stumps which are left after cutting the cane into pieces, and the whole device takes the place of the old system of plowing the stools up with a moldboard breaker-plow and the employment of a crew of men with mattocks or hoes to cut the stools in pieces.

When desired, the implement may be employed to cut or trim the edges of the ratoon-rows and not move any of the soil to the center between the rows. It may also be employed to cut off straggling roots, which lead to the center between the rows, and when constructed to straddle the rows it will be seen that the double arrangement of disks and cutters enables the operator to complete the work on both sides of the row, as well as by going over it a single time and with no more disturbance to the water-ditches.

The bearing-wheels 3 are mounted upon crank-axles 10, turnable in boxes 15, which are carried upon a suitable frame, which may be the transverse beam or plate P, supported by the rectangular yokes 11 or other suitable structures bolted, clamped, or otherwise secured to the plow-beams.

The standards for the colters range downwardly from the plow-beams, as shown at 13, and are so disposed that the cane or trash will be cut by them, not interfering with the operation of the right and left hand disks or plows which follow.

The axles of the wheels are movable, so that the wheels may be adjusted with relation to the frame.

The raising or lowering of the plow beams or frames is effected by means of levers, as shown at 14, these levers being connected with each of the crank-wheels, and segmental racks and pawls serve to hold them at any desired point of adjustment. The crank-shafts upon which the wheels are mounted are provided with bearings to give a rigid and adjustable support and to reduce the torsional strain upon the frames to which they are attached.

A seat and such other usual accessories as may be desired may be used with this machine without departing from the spirit of my invention.

The frame carrying the wheels and axles is pivoted in the center, and by means of a lever 16 and connecting-rod 17 this frame may be turned to one side or the other, and thus the gage and bearing wheels may be changed to travel in a direction to right or left at will.

The above-described arrangement enables the revolving knife or knives to split through the center of the ratoon stools or stumps, and the disposition of the right and left hand disks is such that each of these halves is again split into two slices, making four pieces. The subsoiler which works in the rear then spreads apart the pieces thus cut up and divided.

When the machine is employed to burst out centers, the wheels are separated to travel astride of the rows and a double-shovel plan similar to that shown in my Patent No. 709,601, dated September 23, 1902, is substituted for the central coulter 8.

Having thus described my invention, what I claim, and desire to secure by Letters Patent, is—

1. A bedding and furrowing plow comprising a pair of parallel beams, angular frames attachable to said beams, hangers fixed to the angular sides of the frames, revoluble disks angularly journaled to said hangers, and independent subsoiling-plows on the frames in line behind each disk.

2. A plow comprising a pair of parallel beams, angular frames fixed to the sides of the beams, revoluble disks secured to the angular sides of the frames, space-blocks by which the beams may be separated, and fastening means for uniting the beams, frames and space-blocks.

3. A plow comprising a pair of parallel beams, space-blocks adapted to fit between the beams and bolts therefor, revoluble angularly-disposed disks journaled and turnable upon opposite sides of the beams, and subsoilers, adjustably carried in line behind each disk.

4. A plow comprising a pair of parallel separable beams and space-blocks therefor, angular frames fixed to the beams, angularly-revoluble disks mounted on the frames and means by which they are supported upon opposite sides of the beams, and colter-knives mounted in front and between the disks.

5. A plow comprising a pair of parallel, separable beams and space-blocks therefor, substantially triangular frames fixed to the beams and having rear ends extending across the back transverse to the line of the beams and thence extending forward parallel with said beams, bolts by which said parallel portions of the frames are secured to the space-blocks and beams, hangers fixed to the divergent sides of said frames and revoluble disks journaled to the hangers.

6. A plow comprising a pair of parallel separable beams and space-blocks therefor, angular frames having the front and rear ends fitted to the beams and space blocks, hangers and means for fixing said hangers to the angular sides of the frames, and disk plows carried by the hangers and revoluble in planes which intersect each other and the beams in front of the disks.

7. A plow comprising a pair of parallel, separable beams and space-blocks therefor, angular frames and means for securing them to the space-blocks and beams, inclined revoluble disk plows, and hangers by which they are supported from the divergent sides of the frames, subsoilers secured to said frames in line with and in rear of each plow and colters mounted in front and in the line of travel of the lower edges of the disks.

8. A plow comprising a pair of parallel beams, space-blocks adapted to fit between said beams, angular frames located upon each side and bolts by which the beams, space-blocks and frames are secured together, angularly-revoluble disk plows supported from the divergent sides of said frames, subsoilers dependent from said frames in rear of the disk plows, revoluble colters mounted in front and in line of travel of the disks and adjustable in unison therewith.

9. A plow comprising a pair of parallel separable beams, space-blocks adapted to fit between the beams, angular frames and means for securing the frames to the beams and space-blocks, revoluble disk plows and hangers by which the disks are supported from the angular sides of the frames, subsoilers dependent from the rear of said frames in the line of travel of each of the disks and colters revoluble in the line of travel in front of the disks, bearing-wheels upon which the front ends of the plow-beams are supported and crank-axles for said wheels, a transverse beam pivotally attached at the front upon which said axles are journaled, and means for turning said beam and changing the direction of travel of the wheels.

In testimony whereof I have hereunto set my hand in presence of two subscribing witnesses.

ALBERT HORNER.

Witnesses:
W. P. GIBERSON,
W. D. SCHMIDT.